United States Patent
Goldbach et al.

(10) Patent No.: US 8,574,462 B2
(45) Date of Patent: Nov. 5, 2013

(54) HIGH TEMPERATURE STABLE POLYELECTROLYTES HAVING BACKBONE AROMATIC GROUPS

(75) Inventors: James T. Goldbach, Paoli, PA (US); James E. Copenhafer, Columbia, SC (US); David A. Mountz, Exton, PA (US); Scott R. Gaboury, Blue Bell, PA (US)

(73) Assignee: Arkema Inc., King of Prussia, PA (US)

( * ) Notice: Subject to any disclaimer, the term of this patent is extended or adjusted under 35 U.S.C. 154(b) by 699 days.

(21) Appl. No.: 12/519,072

(22) PCT Filed: Dec. 5, 2007

(86) PCT No.: PCT/US2007/086442
§ 371 (c)(1),
(2), (4) Date: Apr. 19, 2010

(87) PCT Pub. No.: WO2008/076637
PCT Pub. Date: Jun. 26, 2008

(65) Prior Publication Data
US 2010/0197816 A1 Aug. 5, 2010

Related U.S. Application Data

(60) Provisional application No. 60/874,932, filed on Dec. 14, 2006.

(51) Int. Cl.
*H01B 1/12* (2006.01)
*H01M 8/10* (2006.01)

(52) U.S. Cl.
USPC .............. 252/500; 429/493; 521/27; 521/25

(58) Field of Classification Search
USPC ................. 252/500; 429/493; 521/27, 25
See application file for complete search history.

(56) References Cited

U.S. PATENT DOCUMENTS

| | | | |
|---|---|---|---|
| 5,438,082 A | 8/1995 | Helmer-Metzmann et al. | |
| 6,090,895 A | 7/2000 | Mao et al. | |
| 6,869,980 B2 | 3/2005 | Cui | |
| 6,962,959 B2 | 11/2005 | Kurano et al. | |
| 7,396,880 B2 | 7/2008 | Goldbach et al. | |
| 2005/0064260 A1 | 3/2005 | Otsuki et al. | |
| 2005/0077233 A1* | 4/2005 | Hedhli et al. | 210/500.27 |
| 2006/0014067 A1* | 1/2006 | Hedhli et al. | 429/33 |
| 2006/0155127 A1 | 7/2006 | Gao et al. | |
| 2006/0269815 A1* | 11/2006 | Goldbach et al. | 429/33 |

FOREIGN PATENT DOCUMENTS

| | | |
|---|---|---|
| EP | 0382356 A2 | 1/1990 |
| EP | 382356 A2 * | 8/1990 |
| JP | 2006104382 | 4/2006 |
| WO | WO 2008076637 A1 * | 6/2008 |

OTHER PUBLICATIONS

CAS reg. No. 72355-90-9, Nov. 16, 1984.*
CAS reg. No. 146673-85-0, Mar. 26, 1993.*
Ueda, Mitsuru, et al., "Synthesis and Characterization of Aromatic Poly(ether Sulfone)s Containing Pendant Sodium Sulfonate Groups", Journal of Polymer Science, Part A: Polymer Chemistry (1993), 31 (4), 853-8.*
Xing, P., "Sulfonated Poly(aryl ethter ketone)s Containing Naphthalene Moieties Obtained by Direct Copolymerization as Novel Polymers for Proton Exchange Membranes"—Journal of Polymer Science Part A : Polymer Chemistry, vol. 42, p. 2866-2876 (2004).
Hickner, A., "Alternative Polymer Systems for Proton Exchange Membranes"—Chem. Rev. 2004, 104, p. 4587-4612.
Robertson, G.,"Casting solvent interactions with sulfonated poly (ether ether ketone) during proton exchanage membrane fabrication"—Journal of Membrane Science 2319 (2003), p. 113-121.
Gao, Y.,"Direct Copolymerization of Sulfonated Poly (phtalazinone arylene ethers) for Proton-Exchange-Membrane Materials,"—Journal of Polymer Sciences, Part A: Polymer Chemistry, vol. 41, p. 2731-2742 (2003).
Zhong, S., et al., "Preparation and evaluation of a proton exchange membrane based on crosslinkable sulfonated poly(ether ether ketone)s", Journal of Power Sources, Elsevier SA, CH, vol. 162, No. 1, Nov. 8, 2006, pp. 51-57.
Zhang, W., et al., "Novel covalently cross-linked poly(etheretherketone) ionomer membranes", Journal of Power Sources, Elsevier SA, CH, vol. 155, No. 1, Apr. 18, 2006, pp. 3-12.

* cited by examiner

*Primary Examiner* — Douglas McGinty
(74) *Attorney, Agent, or Firm* — Thomas F. Roland

(57) ABSTRACT

The invention relates to polyelectrolytes having backbone aromatic groups, and in particular to aromatic backbone group polyelectrolytes having high levels of sulfonation as well as cross-linking functionality. Preferably the polyelectrolyte backbone is free of linear alkyl groups.

25 Claims, No Drawings

HIGH TEMPERATURE STABLE POLYELECTROLYTES HAVING BACKBONE AROMATIC GROUPS

This application claims benefit, under U.S.C. §119 or §365 of U.S. Provisional Application No. 60/874,932, filed Dec. 14, 2006; and PCT/US2007/086442, filed Dec. 5, 2007.

FIELD OF THE INVENTION

The present invention relates to polyelectrolytes having backbone aromatic groups, and in particular to aromatic backbone group polyelectrolytes having high levels of sulfonation as well as cross-linking functionality. Preferably the polyelectrolyte backbone is free of —$CH_2$—$CH_2$— groups.

BACKGROUND OF THE INVENTION (Co)polymers useful in fuel cell membranes and other acidic, high-temperature, hydrated environments, must contain only stable functional groups. Unfortunately, most polymer structures, and their precursor monomers, contain groups that do not withstand such environments, for example ester, acrylamide, and many aliphatic functional groups. To solve this problem, a novel approach to monomer and polymer syntheses is required using only hydrolytically-stable and peroxide-stable functional groups. In addition, the starting materials should be of low-cost, the process complexity kept minimal, and the final structures well-defined.

Typical polyelectrolytes (as disclosed in U.S. Pat. No. 7,396,880) are styrenic-type polyelectrolytes with pendent aromatic groups, but no aromatic groups in the polymer backbone. They can be synthesized and incorporated into a PVDF/polyelectrolyte blend membrane. Membranes fabricated using these methodologies have shown dramatically improved hydrolytic stability in a high-temperature (80° C.), acidic (pH<1) environment, versus prior generations of materials. However, to increase cell performance and reduce balance-of-plant costs for an operating fuel cell, the target operating conditions for fuel cell membranes are becoming increasingly more severe. One important requirement is to have a membrane which will operate and remain very stable at temperatures in excess of 80° C. The materials described in U.S. Pat. No. 7,396,880 have proven to perform well at 80° C., but tend to show degradation when used at higher temperatures. These degradation pathways include, but are not limited to, peroxide attack on susceptible functionalities or positions on the polyelectrolyte, and loss of sulfonate groups through aromatic-ring desulfonation. The mode of degradation is likely due to scission of the carbon-carbon, hydrogenated aliphatic backbones, common to all styrenic-type (co)polymers. The benzylic hydrogens which are bonded to carbons adjacent to the aromatic rings are known to be particularly prone to attack by adventitious peroxide species (Scheme 1). The hydrogen atoms can be relatively easily removed from the carbon-carbon backbones, generating a carbon-centered radical on the polymer chain. This radical can then participate in one of a number of processes either causing a release of the aromatic ring from the polymer backbone (Scheme 2) or a scission of the polymer chain (Scheme 3). Both of these processes are undesirable as they cause loss of the active sulfonate groups from the polyelectrolytes or reduction in overall molecular weight, respectively.

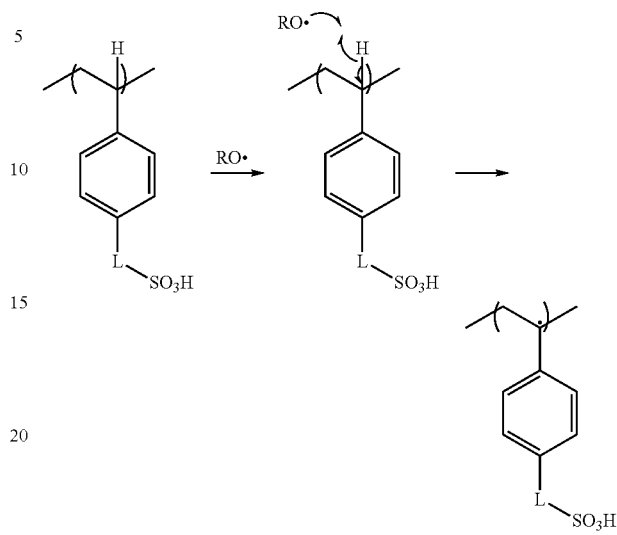

Scheme 1. Proposed mechanism for peroxide attack on styrenic-type polyelectrolytes.

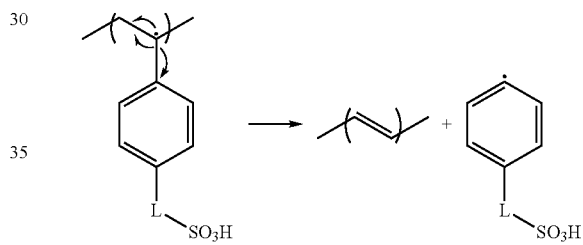

Scheme 2. Proposed mechanism for loss of aromatic and sulfonate groups from polymer backbone.

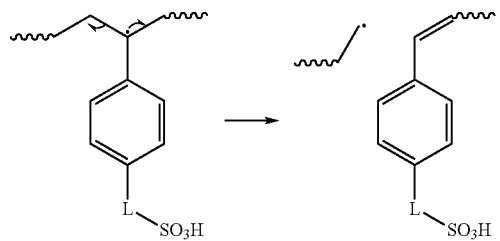

Scheme 3. Proposed mechanism for backbone scission due to radical attack.

The degradation pathways described herein are fundamentally different from those described in U.S. Pat. No. 7,396,880, where, a specific functional group was susceptible to hydrolytic attack by acid and water, causing predominantly a loss of sulfonate groups. Under 80° C. operation, this rate of this hydrolytic mechanism was significantly more rapid than any other degradation pathway. The polyelectrolytes described here (Schemes 1-3), and those described in U.S. Pat. No. 7,396,880, ameliorated the hydrolytic degradation and permitted 80° C. operation of membranes containing such polyelectrolytes. Given this increased chemical stability, the additional degradation mechanisms described above are becoming more predominant than previously recognized. The fundamental weak component to these polyelectrolytes is their aliphatic backbone, particularly, benzylic positions which are present in styrenic-type copolyelectrolytes.

SUMMARY OF THE INVENTION

The invention relates to a polyelectrolyte comprising one or more backbone block units, wherein said polyelectrolyte backbone comprises substituted aryl units and no alkyl units of 2 or more carbons in the backbone and wherein said polyelectrolyte comprises from 1 to 49 mole percent of sulfonate functional groups and 1 to 49 mole percent of cross linkable groups.

The invention further relates to method for forming the unique aryl-based polyelectrolytes.

DETAILED DESCRIPTION OF THE INVENTION

In order to produce the (co)polyelectrolytes of the invention having aromatic-containing backbones, a new polymerization scheme is required that does not result in aliphatic backbones. The free-radical scheme described in U.S. Pat. No. 7,396,880, incorporated herein by reference, results in a hydrogenated C—C backbone when non-fluorinated monomers are used. As described above, this type of backbone may not be desirable for application in a harsh fuel cell membrane operating environment.

Several polymerization schemes can be used to synthesize the aromatic backbone (co)polyelectrolytes of the present invention. Aromatic groups are well-known to exhibit high resistance to free-radical attack and degradation. The aromatic moieties could be linked together using any number of functional groups which are stable to hydrolytic degradation and radical-attack including a simple C—C bond, ether, thioether, sulfone, alkylamino, ketone, phosphino, perfluoroalkyl, gem-dicyanoalkyl and the like. Groups otherwise commonly used to link together aromatic backbones such as ester, carbonate, amide, urethane and the like could be incorporated, but would be expected to exhibit poor hydrolytic stability and would therefore be non-preferred.

One methodology for producing the polyelectrolytes of the invention is by nucleophilic aromatic substitution (NAS) condensation polymerization (Scheme 5).

Scheme 4. General schematic of free-radical chain polymerization.

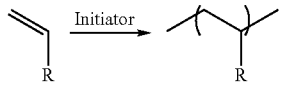

R = ester, nitrile, halo, phenyl, H, alkylamino, or other group capable of stabilizing a C-centered radical.

Scheme 5. General schematic of a NAS condensation polymerization.

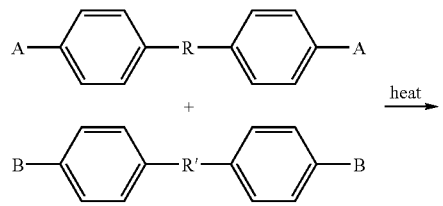

-continued

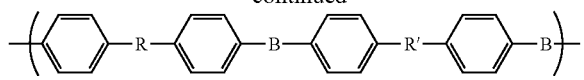

A = a 'leaving' group capable of eliminating from the monomer by nucleophilic attack including: F, Cl, Br, I, nitro, fluorosulfonate ester and the like. B = a nucleophilic group such as alcohol, metal alkoxide, amine, thiol, metal thiolate, metal carbanion and the like. R = an electron-withdrawing group which is also hydrolytically and free-radical attack stable, such as, sulfone, ketone, thioketone, phosphine, phosphine oxide, and the like. R' = R or another hydrolytically-stable and free radical-stable group such as a bond, disubstituted alkane, disubstituted perfluoroalkane, ether, thioether, (alkyl)amine, and the like.

In one embodiment, as shown in Scheme 5, NAS condensation polymerization is carried out using two monomers, each bearing two functionalities. One monomer bears functionalities which are nucleophilic, while the other monomer bears functionalities which act as good leaving groups, i.e. are amenable to nucleophilic attack. Upon addition of heat, and or a basic (caustic-type) catalyst or activator, the nucleophilic functionalities react at the carbons to which the 'leaving groups' are bound, through the well-known $S_N Ar$ mechanism. The result is an alternating polyaddition of each comonomer and a building-up of molecular weight with time. Through this methodology, the resulting copolymer contains linear chains containing aromatic groups as well as functionality present in the starting monomers with the exception of the leaving groups (A), which were eliminated through the polymerization chemistry. As long as the stoichiometry of the A to B groups remains 1:1, high molecular weight copolymer can be expected. If the stoichiometry of either groups is altered, low molecular weight, telechelic, oligomeric materials can be produced. Most often this is not desired, however these types of materials can be used as precursors to controlled-architecture materials as described below.

Another embodiment of the invention using NAS condensation copolymerization is the use of a single, bifunctional monomer bearing both the nucleophilic (B) and leaving group (A). The use of this type of monomer results in a similar polymer structure, however, no second comonomer is needed as the single (AB) monomer bears both functionalities necessary for efficient polymerization (Scheme 6).

Scheme 6. Alternate general methodology for NAS condensation polymerization.

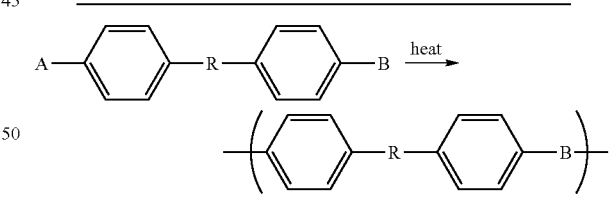

A, B, and R can be defined as described in Scheme 5.

One could additionally envision using comonomers bearing more than two nucleophilic (B) or leaving groups (A) and/or combination thereof. In cases such as these, one would expect non-linear, or 'branched', structures to be produced. Each multi-functional monomer unit would act as a position where more than one chain could propagate. This type of structure could be advantageous, as branched materials have been shown to exhibit significantly different rheological behavior when compared to their linear counterparts. The complexity of the structures attainable is immense as one changes the number, type and stoichiometry of the reactive groups in this type of copolymerization.

Scheme 7. General schematic for synthesis of a branched copolymer using NAS condensation copolymerization.

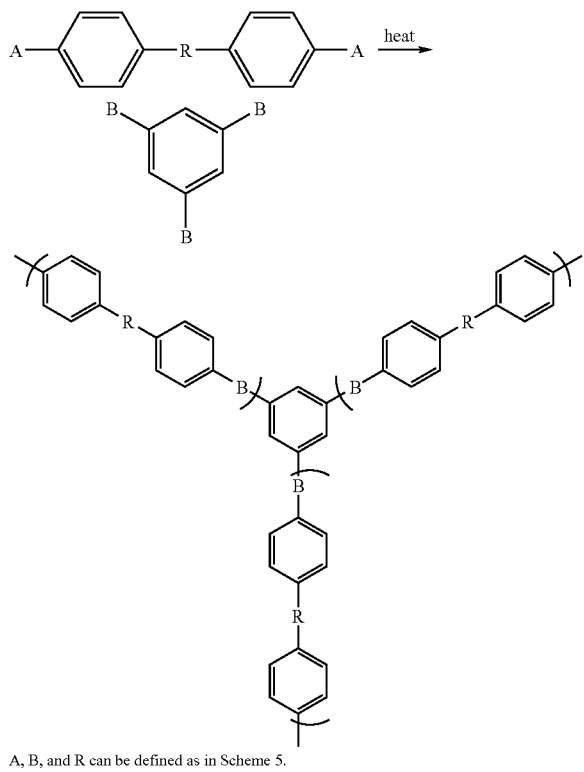

A, B, and R can be defined as in Scheme 5.

In addition to altering the backbone branching, one can also use NAS condensation copolymerization to control the relative placement of monomer units in the creation of a block, or 'blocky' type copolymer. Each 'block' of this type of copolymer can have similar or widely differing chemistries. These chemistries can be tuned as necessary to affect a nanoscopic morphology in the bulk block copolymer or to be particularly miscible with another component, such as in a blend of block copolymer with another material. One can synthesize such a 'blocky' material through a two-step procedure utilizing careful stoichiometric control of the 'A' and 'B' functionalities. First, two (or more) relatively low molecular weight oligomers (blocks) are synthesized separately by using an over-stoichiometric amount of each monomer forming 'telechelic' polymer blocks with controlled endgroups. In a second step, these telechelic blocks are reacted to form a multi-block structure (Scheme 8).

Using these methodologies and/or combinations thereof, a myriad of variations of polymers can be synthesized. When changing side substituents and linking functionalities are taken into account, the number of possible, final polymer structures again grows exponentially.

Scheme 8. General, 2-step approach to synthesis of blocky copolymers by NAS condensation copolymerization.

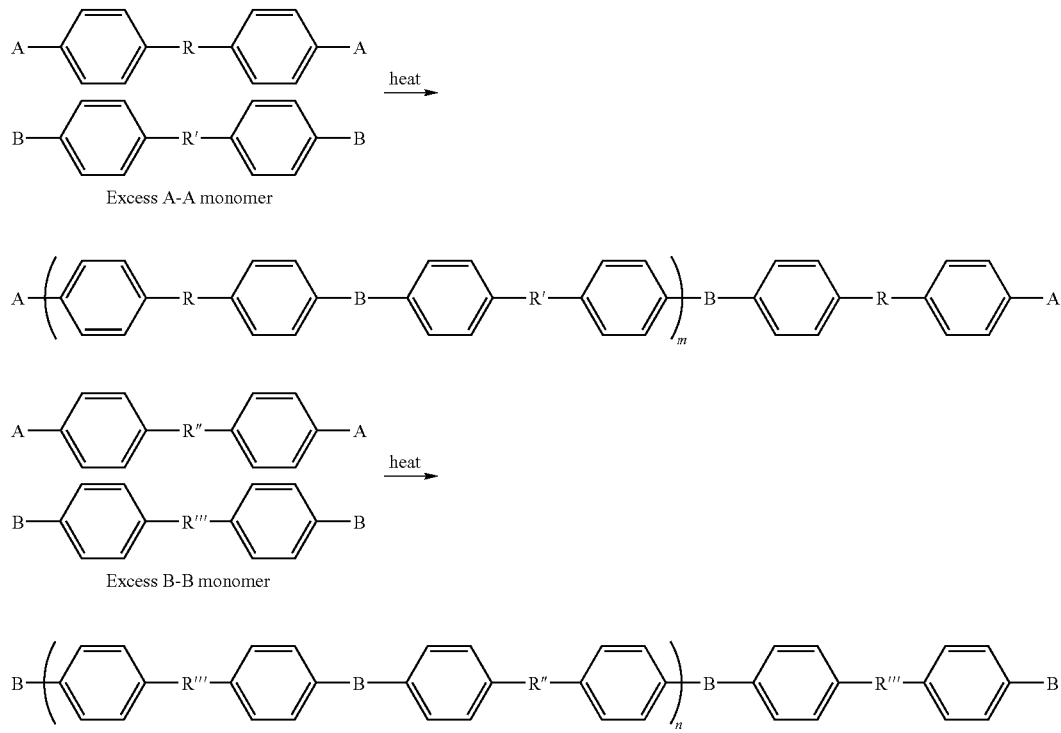

-continued
2nd Step-Blocky Copolymer Synthesis

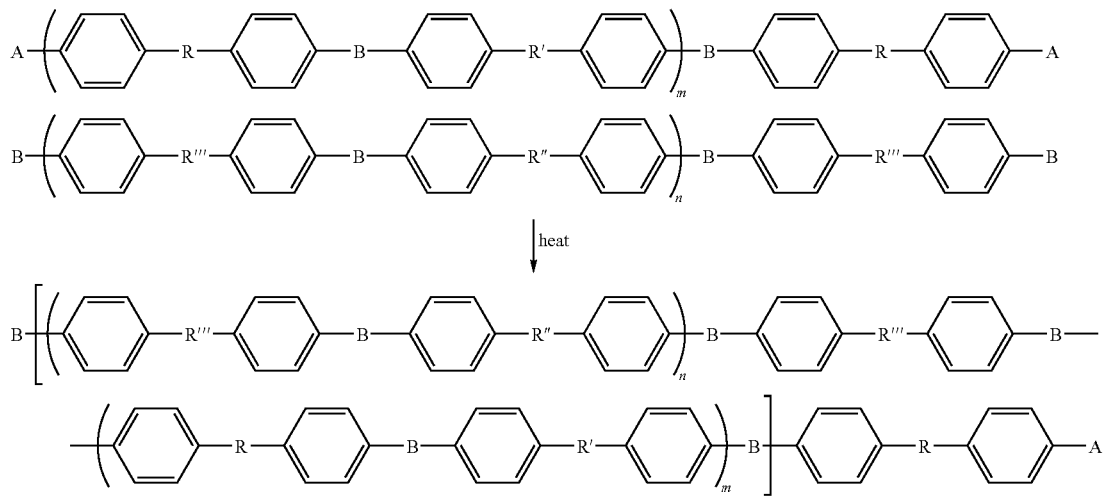

For an aromatic-backbone-type copolyelectrolyte to find use in a fuel cell membrane, it must bear acidic or protogenic functional groups. These groups will facilitate the conduction of protons across the final membrane, which is essential to the operation of a fuel cell. These groups can be incorporated at the monomer level (i.e. before copolymerization), or during a post-polymerization modification step. In addition to bearing the appropriate functional groups for proton conduction, the overall architecture of the polyelectrolyte (branched, blocky, hyperbranched, etc.) will affect the final membrane's performance and mechanical properties. It is also advantageous for the copolyelectrolyte to bear cross-linkable groups which are activated during the film-forming (membrane casting) process. This additional step helps to avoid any leaching of the copolyelectrolyte during use and operation of the membrane.

In a preferred embodiment of the invention the copolyelectrolytes have the following properties:

1. They contain only non-hydrolyzable monomers and functional groups.
2. They have a very high degree of sulfonation as well as cross-linkable groups.
3. They are formed by synthetic steps that are controllable and give high yield.
4. Aromatic groups are the main component of the polymer backbone.
5. Synthetic routes can be either copolymerization of appropriately functionalized monomers, or post-polymerization-modification routes.

Several approaches can be used to produce the copolyelectrolyte of the invention. They will be presented below as both a General approach, and a specific embodiment.

General Approach 1:

Scheme 9. General schematic of aryl-backbone copolyelectrolyte for use in a PVDF blend fuel cell membrane.

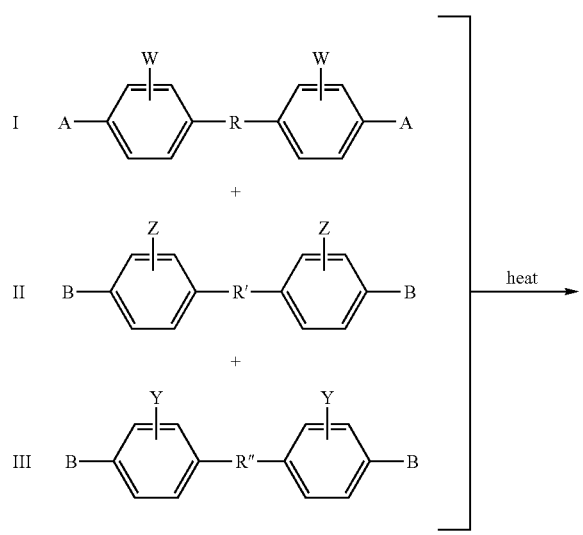

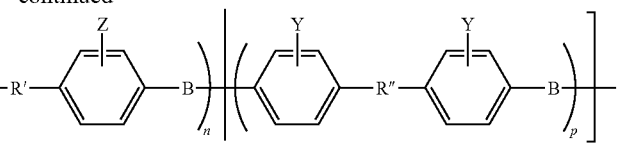

Where:
A=a 'leaving' group capable of eliminating from the monomer by nucleophilic attack including: F, Cl, Br, I, nitro, fluorosulfonate ester and the like
B=a nucleophilic group such as alcohol, metal alkoxide, amine, thiol, metal thiolate, metal carbanion and the like
R=an electron-withdrawing group which is also hydrolytically and free-radical attack stable, such as, sulfone, ketone, thioketone, phosphine, phosphine oxide, and the like
R'=R or another hydrolytically-stable and free radical-stable group such as a bond, disubstituted alkane, disubstituted perfluoroalkane, ether, thioether, (alkyl)amine, and the like
R"=R' and/or =R, or another hydrolytically-stable and free radical-stable group such as a bond, disubstituted alkane, disubstituted perfluoroalkane, ether, thioether, (alkyl)amine, and the like
W=Sulfonate, phosphonate, carboxylate
Z=Hydrogen, sulfonate, phosphonate, carboxylate
Y=Group capable of cross-linking i.e. alcohol, amine, vinylic, alkyl halide, or the like.
*Groups Z and Y can be bound to any open position on each aromatic ring, either ortho or meta to groups R, R', R" with one group (Z or Y) per aromatic ring.
**Mol fractions of monomers are such that I=50%, II=[(1.0−I)−III]; and III=[(1.0−I)−II]].
***II=0.01 to 0.49 mol fraction; III=0.01 to 0.49 mol fraction.
****When group Z is hydrogen, post-polymerization reaction can be performed to introduce a group W onto the ring.

Specific Example 1

Sulfonated Aryl-Sulfone Type Material, with Pendent Allyl Groups

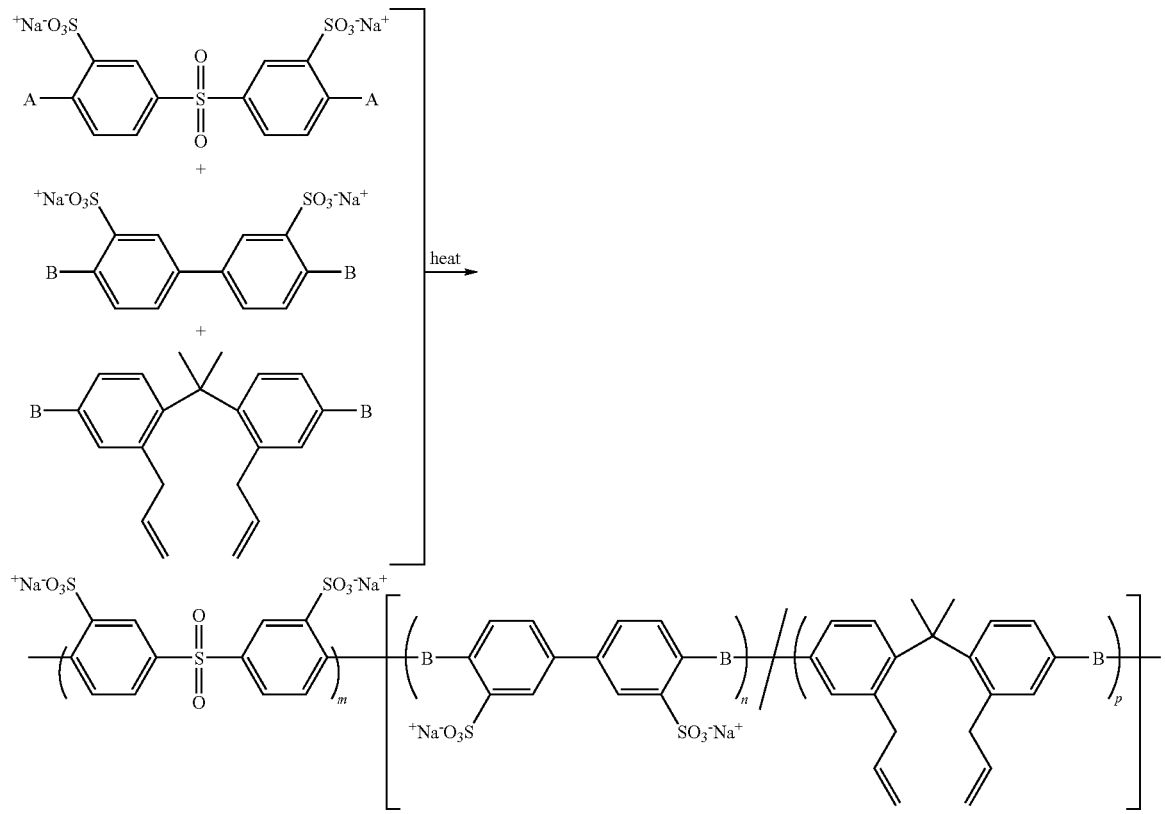

Scheme 10.

More specific example of a copolymer produced using 'General Approach 1', where W = Z = sulfonate, Y = allylic, R = sulfone, R' = a bond, R" = 2,2'-propyl.

Specific Example 1a
Post-Polymerization Introduction of Acidic Group.
(Z=Hydrogen)
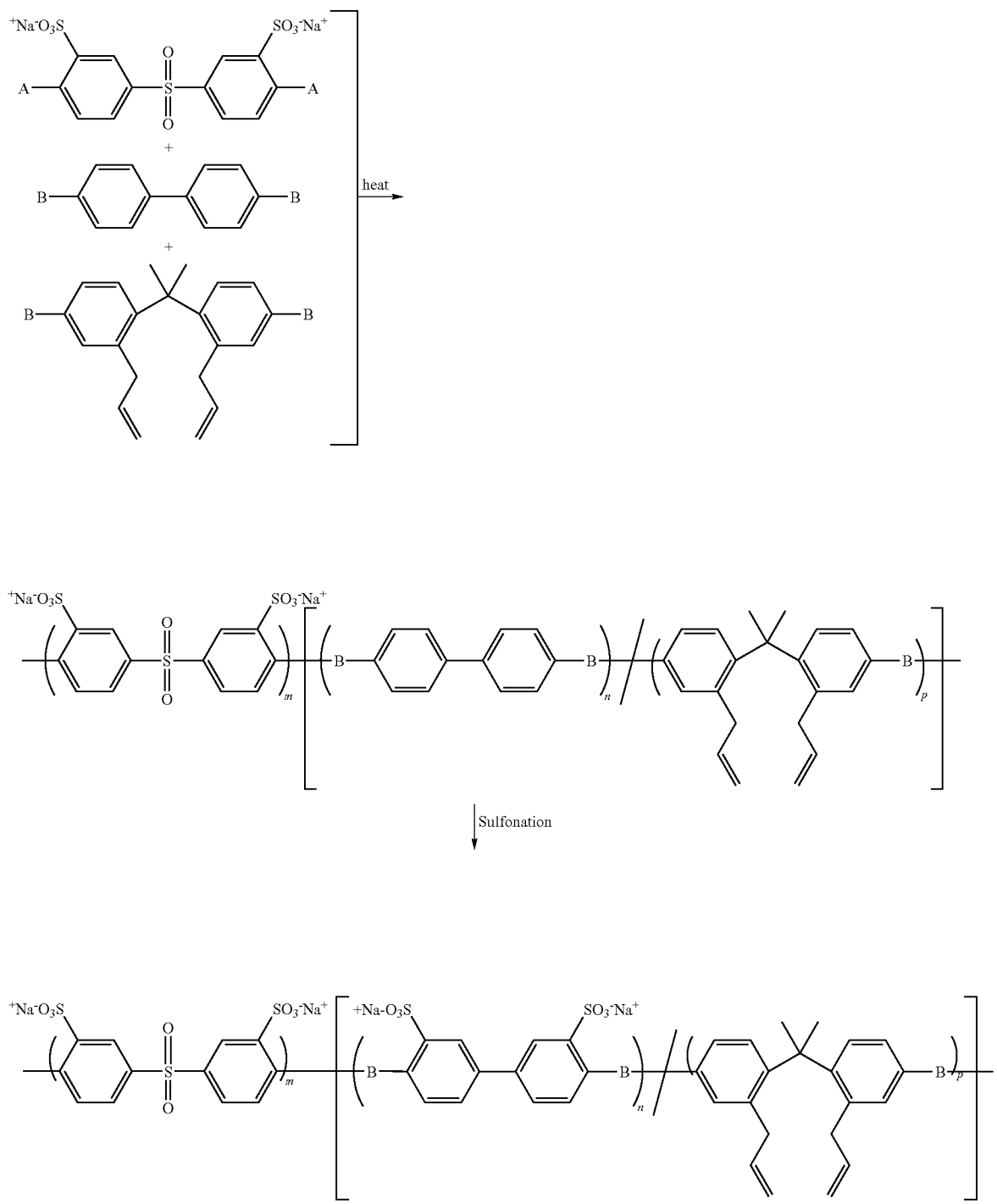
Scheme 11.
More specific example of a copolymer produced using 'General Approach 1' and incorporating a post-polymerization sulfonation step, where W = sulfonate, Z = hydrogen, Y = allylic R = sulfone, R' = a bond, R" = 2,2'-propyl.

General Approach 2:

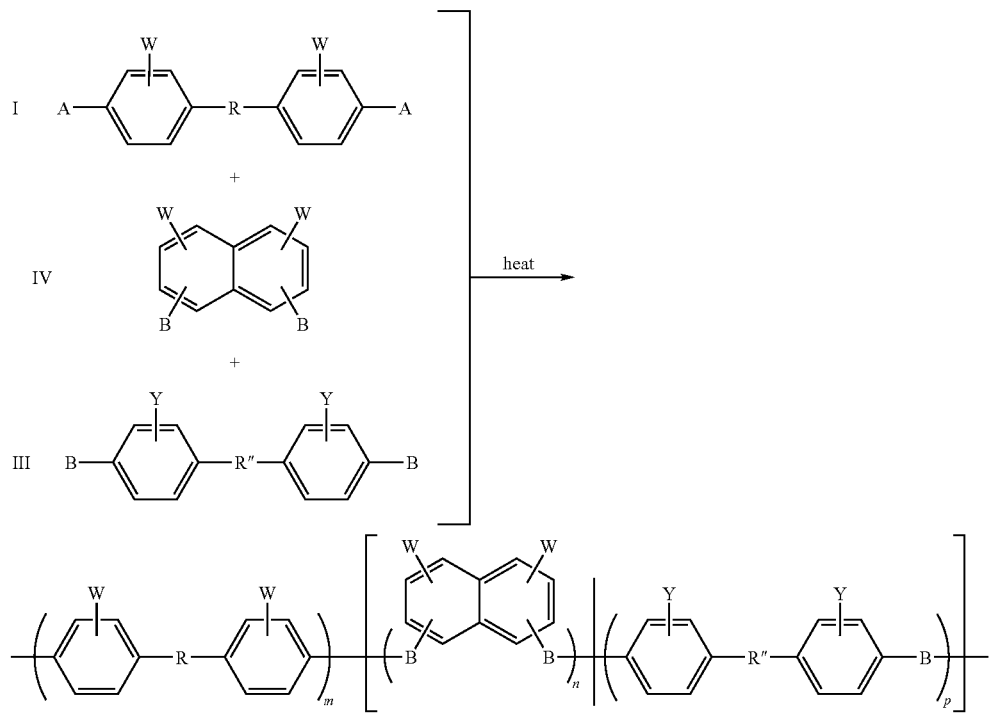

Where:
A=a 'leaving' group capable of eliminating from the monomer by nucleophilic attack including: F, Cl, Br, I, nitro, fluorosulfonate ester and the like
B=a nucleophilic group such as alcohol, metal alkoxide, amine, thiol, metal thiolate, metal carbanion and the like
R=an electron-withdrawing group which is also hydrolytically and free-radical attack stable, such as, sulfone, ketone, thioketone, phosphine, phosphine oxide, and the like
R"=hydrolytically-stable and free radical-stable group such as a bond, disubstituted alkane, disubstituted perfluoroalkane, ether, thioether, (alkyl)amine, and the like
W=Sulfonate, phosphonate, carboxylate
Y=Group capable of cross-linking i.e. alcohol, amine, vinylic, alkyl halide, or the like.

*Groups B on monomer IV can be bound to the naphthalenic ring at any position (1-8), not occupied by a group W.
**Groups W on monomer IV can be bound to the naphthalenic ring at any position (1-8), not occupied by a group B.
***Preferrably, Groups B on monomer IV are bound at the 4- and 5-positions, and Groups W at the 2- and 7-positions.
****Mol fractions of monomers are such that I=50%, IV= [(1.0−I)−III]; and III=[(1.0−I)−IV)]. Such that the mol fractions in the final copolymer are m=(n+p)=0.5. n=0.01 to 0.49, and p=0.01 to 0.49

Specific Example 2

Sulfonated Aryl-Sulfone Type Material, with Pendent Allyl Groups and Naphthalenic Groups in the Backbone Scheme 12.

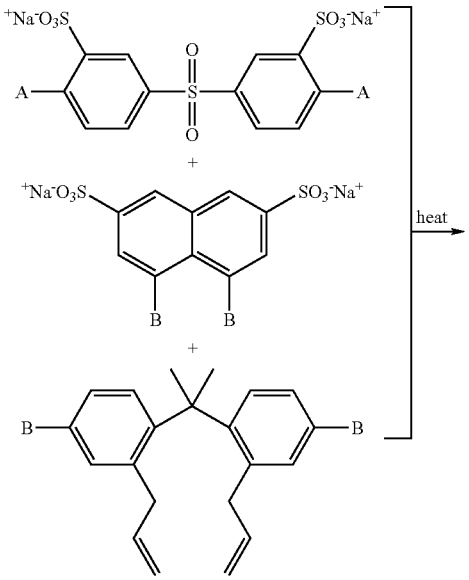

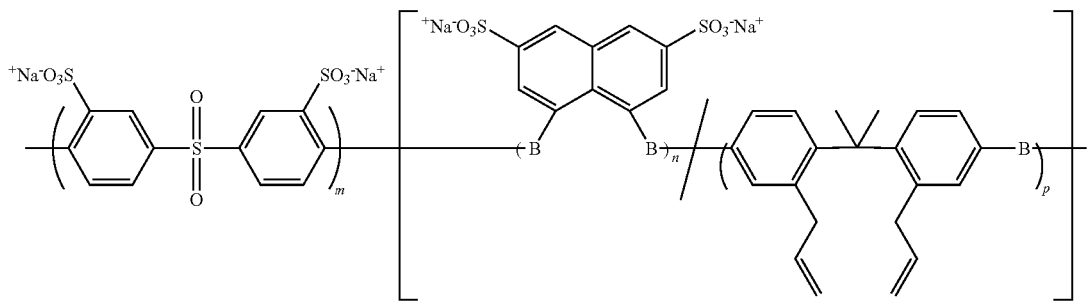

More specific example of a copolymer produced using 'General Approach 2', where W = sulfonate, Y = allylic, R = sulfone, R″ = 2,2′-propyl.

General Approach 3:

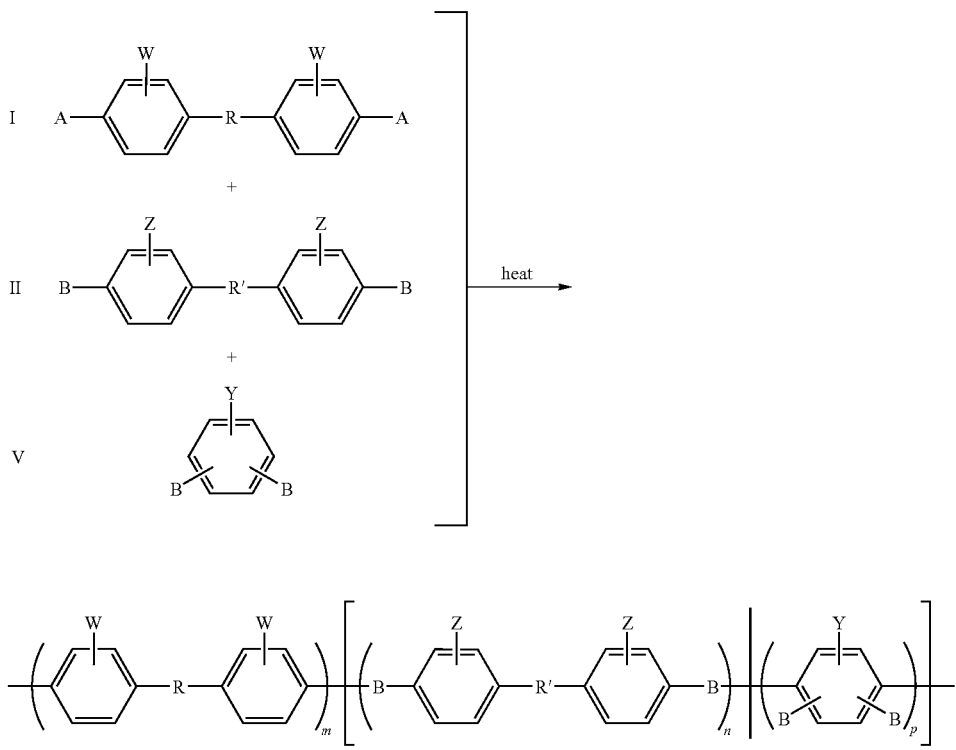

Where:
A=a 'leaving' group capable of eliminating from the monomer by nucleophilic attack including: F, Cl, Br, I, nitro, fluorosulfonate ester and the like
B=a nucleophilic group such as alcohol, metal alkoxide, amine, thiol, metal thiolate, metal carbanion and the like
R=an electron-withdrawing group which is also hydrolytically and free-radical attack stable, such as, sulfone, ketone, thioketone, phosphine, phosphine oxide, and the like
R″=hydrolytically-stable and free radical-stable group such as a bond, disubstituted alkane, disubstituted perfluoroalkane, ether, thioether, (alkyl)amine, and the like
W=Sulfonate, phosphonate, or carboxylate
Z=Hydrogen, sulfonate, phosphonate, or carboxylate
Y=Group capable of cross-linking i.e. alkanol, alcohol, alkylamine, amine, vinylic, alkyl halide, or the like.
*If Groups Z on monomer II, are hydrogen, conversion to acidic groups W may be possible as in 'Specific Example 1a'.
**Groups B on monomer IV may be bound to any ring position not occupied by Group Y.
***Group Y on monomer IV may be bound to any ring position not occupied by Groups B.
****Mol fractions of monomers are such that I=50%, II= [(1.0−I)−V]; and V=[(1.0−I)−II)]; Such that the mol fractions in the final copolymer are m=(n+p)=0.5. n=0.01 to 0.49, and p=0.01 to 0.49

Specific Example 3
Sulfonated Aryl-Sulfone Type Material, with Pendent Benzyl Alcohol Groups
Scheme 13
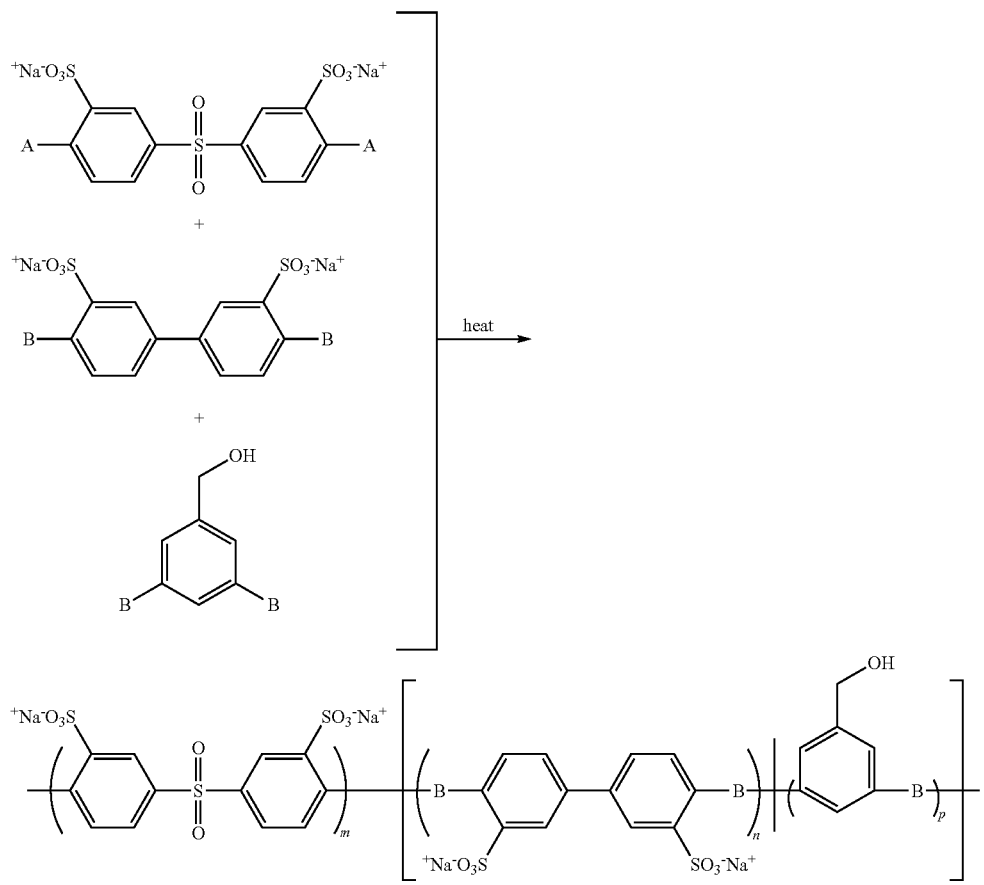
More specific example of a copolymer produced using 'General Approach 3', where W = sulfonate, Y = benzyl alcohol, R = sulfone, R' = a bond, Groups B and Y on monomer IV take on a 1,3,5-substitution pattern.
General Approach 4:
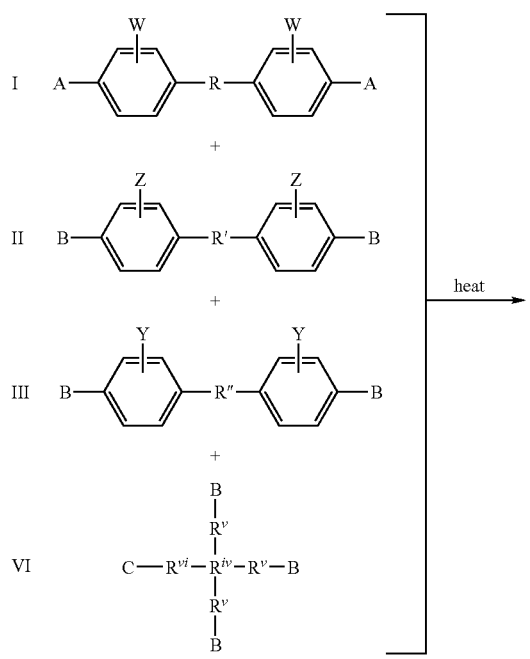

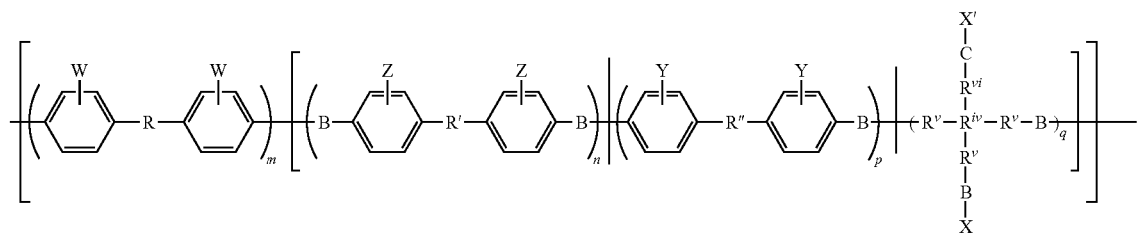

Where:
A=a 'leaving' group capable of eliminating from the monomer by nucleophilic attack including: F, Cl, Br, I, nitro, fluorosulfonate ester and the like
B=a nucleophilic group such as alcohol, metal alkoxide, amine, thiol, metal thiolate, metal carbanion and the like
R=an electron-withdrawing group which is also hydrolytically and free-radical attack stable, such as, sulfone, ketone, thioketone, phosphine, phosphine oxide, and the like
R'=R or another hydrolytically-stable and free radical-stable group such as a bond, disubstituted alkane, disubstituted perfluoroalkane, ether, thioether, (alkyl)amine, and the like
R"=hydrolytically-stable and free radical-stable group such as a bond, disubstituted alkane, disubstituted perfluoroalkane, ether, thioether, (alkyl)amine, and the like
$R^{iv}$=a carbon atom, alkane, perfluoroalkane, cycloalkane, aryl, or other hydrolytically- and free-radical-stable group capable of bearing 3 or more additional groups.
$R^v$=an alkyl, cycloalkyl, perfluoroalkyl, aryl, benzyl, or other hydrolytically- and free-radical-stable group.
$R^{vi}$=$R^v$, or is another group selected from those listed for group $R^v$.
C=a hydrogen, alkyl, cycloalkyl, perfluoroalkyl, aryl, benzyl, or other hydrolytically- and free-radical-stable group. OR, if $R^{vi}$=$R^v$, then C=B.

X=an additional aryl-backbone polymer chain (as shown) containing additional branching monomers (branching points) VI
X'=X; IF Rvi=Rv and therefore C=B. Otherwise X'=a hydrogen.
W=Sulfonate, phosphonate, or carboxylate
Z=Hydrogen, sulfonate, phosphonate, or carboxylate
Y=Group capable of cross-linking i.e. alkanol, alcohol, alkylamine, amine, vinylic, alkyl halide, or the like.
*Mol fractions of monomers are such that I=50%, II=[(1.0−I)−(III+VI]; and III=[(1.0−I)−(II+VI)]; and VI=[(1.0−I)−(II+III)]; Such that the mol fractions in the final copolymer are m=(n+p+q)=0.5. n=0.01 to 0.48, and p=0.01 to 0.48, and q=0.01 to 0.48.
*If Groups Z on monomer II, are hydrogen, conversion to acidic groups W may be possible as in 'Specific Example 1a'.

Specific Example 4

Sulfonated Aryl-Sulfone Type Material, with Pendent Allyl Groups and Tri-Substituted Branching Monomer Scheme 14

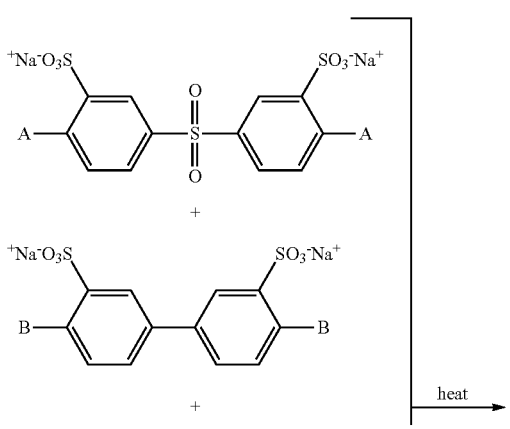

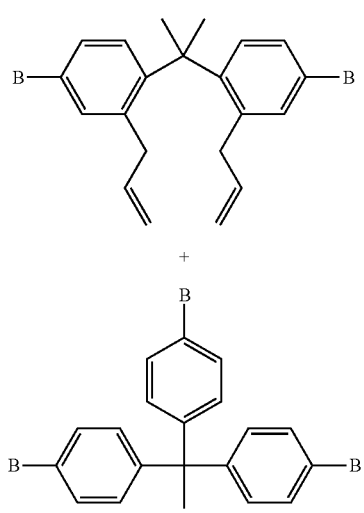

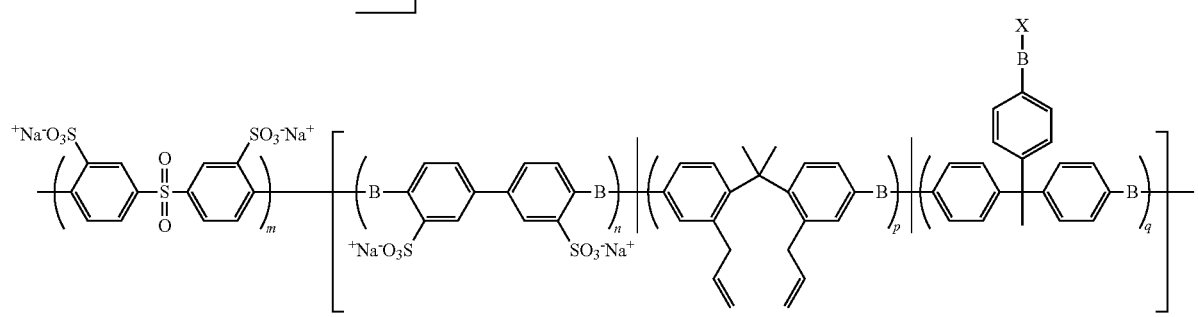

More specific example of a branched copolymer produced using 'General Approach 4', where W = Z = sulfonate, Y = allyl, R = sulfone, R' = a bond, R" = 2,2'-propyl, R$^v$ = aryl, R$^{vi}$ = carbon, C = hydrogen, and X = an additional aryl-backbone polymer chain as shown.

In still another general approach to the formation of the polyelectrolytes of the invention, a single A-B monomer bearing both acidic and cross-linking groups is reacted to form a polyelectrolyte such as shown below as 'General Approach 5'. For this approach, a single monomer, bearing all necessary functionality, as defined previously, is synthesized. As this single molecule bears both the nucleophilic functional group (B), and the NAS-susceptible group (A), no comonomer is necessary to afford polymerization. The resultant polymer can be obtained by application of heat and/or basic (caustic) type catalysis. In addition, the polymerization step is greatly simplified by this type of approach. As only one component is present, it is not required to have specified mol ratios of comonomers.

General Approach 5:
(A-B Monomer Copolymerization)

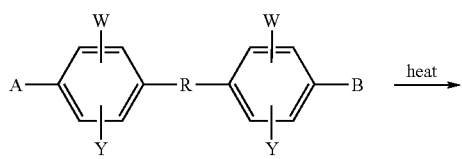

-continued

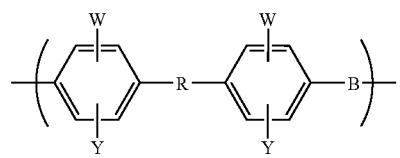

Where:

A=a 'leaving' group capable of eliminating from the monomer by nucleophilic attack including: F, Cl, Br, I, nitro, fluorosulfonate ester and the like B=a nucleophilic group such as alcohol, metal alkoxide, amine, thiol, metal thiolate, metal carbanion and the like R=an electron-withdrawing group which is also hydrolytically and free-radical attack stable, such as, sulfone, ketone, thioketone, phosphine, phosphine oxide, and the like W=Sulfonate, phosphonate, or carboxylate Y=Group capable of cross-linking i.e. alkanol, alcohol, alkylamine, amine, vinylic, alkyl halide, or the like.

Specific Example 5

A-B Monomer Copolymerization

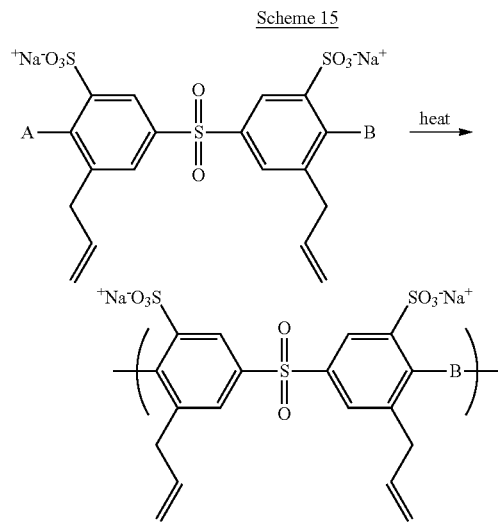

More specific example of a polymer produced using the A-B monomer approach as outlined in 'General Approach 5', where W = sulfonate, Y = allyl, R = sulfone, and A and B are as defined previously.

Polyelectrolyte Blending

In a preferred embodiment, the copolyelectrolytes as described above are processed into a polymer blend as described previously in U.S. patent application Ser. No. 11/409,648, incorporated herein by reference. The blending process is begun by first exchanging the acidic, ionizable groups on the polyelectrolyte with an appropriate tetraalkylammonium hydroxide (TAAOH) to form the tetraalkylammonium salt. Preferably the ammonium salt has a molecular weight of at least 186. Examples of suitable ammonium salts include: tetramethylammonium, tetraethylammonium, tetrapropylammonium, tetrabutylammonium, tetrapentylammonium, and tetrahexylammonium.

A solution of this TAA-neutralized polyelectrolyte may then be solvent-switched to a solvent which may appropriately dissolve the matrix (co)polymer of choice. If the solvent that was used in the ion-exchange column and for the TAAOH neutralization also will dissolve the matrix (co)polymer, this step will not be necessary. A preferred embodiment includes the 'switching' of solvent from that which the ion-exchange column was run to another which the TAA-neutralized polyelectrolyte and the matrix (co)polymer are both fully soluble. This process preferably consists of adding the new solvent to the TAA-neutralized polyelectrolyte solution, then removing the original solvent with heating and application of vacuum (vacuum distillation). Other processes for affording this 'solvent switch' include precipitation of the TAA-neutralized polyelectrolyte with subsequent filtration of the polymer and redissolution in the new solvent. Once all of the original solvent has been removed, an appropriate amount of matrix (co)polymer, which has previously been dissolved in the same solvent, is added. As stated above, the amount of matrix polymer can be from 5 to 95 weight % and the amount of polyelectrolyte can be from 95 to 5 weight % in the blend solution. Preferably, the matrix polymer is present in an amount ranging from 40 to 80 weight % and the polyelectrolyte is present between 20 to 60 weight % in the blend solution. This blended solution is then cast into a thin film or further processed to yield a useful article such as an ion-exchange membrane.

Cross-Linking

A central feature to this invention is the possibility of cross-linking the polyelectrolyte portions of the polymer blend. This is typically achieved by any number of methods familiar to those skill in the art. The method chosen will depend on the chemical nature and structure of the polyelectrolyte as well as the functional groups available to participate in the cross-linking reaction. In general, it is desired that the cross-linking results in functional groups which fulfill the same requirements which were set for the rest of the copolyelectrolyte. These include, but are not limited to: hydrolytic stability and free-radical-attack stability. In addition, it is of utmost importance that the cross-linking reaction not happen prematurely, i.e. prior to film casting and formation. If this were to occur, film casting may not be possible and a non-homogeneous, non-uniform product may result. It is most preferred that the cross-linking reaction take place by either the introduction (and activation) of an external agent, termed the 'cross-linking agent' or 'cross-linker', or by the application of an external stimulus such as heat, UV radiation, or electron beam. It is also possible that the cross-linking be afforded by a combination of these methods such as would occur for the addition of a UV-active sensitizer to the blend with subsequent UV irradiation of the film. Again, the point at which the cross-linking occurs is of utmost importance. The reaction must be controllable such that a uniform film can be cast, with subsequent activation of the cross-linking methodology. The application of the cross-linking may occur prior to or after drying of the wet film.

Film (Membrane) Formation

Casting of the blended solution can be carried out by many different procedures familiar to those skilled in the art. Particularly, solution casting with heating is selected. A quantity of the polymer blend solution is placed on an appropriate substrate. A sharp metal knife is then drawn across the substrate with a gap between the knife and the substrate. The thickness of this gap and the viscosity of the polymer blend solution control the thickness of the formed film. The thickness of the formed film is dependent on the end-use of the material, and can vary from 1.0 μm to 2.0 mm. Preferably, the formed film has a thickness of 10.0 μm to 500.0 μm and most preferably from 20.0 μm to 250.0 μm. This 'wet' film is then dried in a air-circulating oven at elevated temperature. The time and temperature for drying the film can vary widely. The temperature used is from 20° C. to 250° C., preferably from 100° C. to 220° C., and most preferably from 120° C. to 200° C. The drying time for the wet film can also vary widely. The oven residence time should be commercially applicable and scalable in that it can be from 1.0 s to 24 h, preferably from 1.0 min. to 2.0 h, and most preferably from 1.0 min. to 45.0 min.

The thickness of the final, dried film depends on the original thickness of the wet film before drying. This thickness will vary depending on the application intended for the final article. The thickness can be from 1.0 μm to 2.0 mm, preferably from 5.0 μm to 500.0 μm, most preferably from 10.0 μm to 300.0 μm. The dried film is removed from the substrate by typical methods familiar to those skilled in the art. Typically, the film is mechanically peeled from the substrate directly or with the aid of a metal knife. Alternatively, the film can be hydrated or submersed in water or solvent to aid in the removal of the film from the substrate.

The domain size of the polyelectrolyte in a cast film should be preferably less than 1.0 μM, and more preferably between 1 nm to 500 nm. The domain sizes discussed herein are with respect to maximum domain sizes and/or average domain sizes. In a preferred embodiment, the domain sizes recited are the maximum domain sizes, but can be the average domain sizes.

The proton conductivity of the polymer blend of the invention is >20 mS/cm, preferably >50 mS/cm, and most preferably >100 mS/cm. Additionally, the polymer blend has a high degree of mechanical strength, a low swelling when hydrated, hydrolytic (chemical) stability, and a low level of sulfur loss (if sulfonated) in hot water, hot acid, oxidizing and/or reducing environments.

An article, such as a membrane, produced from the polymer blend of the invention can be used as-is or further treated by an acidic washing step to remove the tetraalkyl groups, concurrently reprotonating the ionizable groups present on the starting (co)polymer component. In addition, cross-linking may be employed to improve dimensional stability. Cross-linking may be carried out by the action of an external agent on pendent functionalities present on the polyelectrolyte, the matrix (co)polymer, or combinations thereof. It is also feasible to incorporate internal cross-linking groups that are already pendent on either the polyelectrolyte or the matrix (co)polymer, which are then appropriately activated by application of an external impetus (heat or radiation).

Due to the various advantages described above, the applications of the present invention can include, but are not limited to, films, membranes, fuel cells, coatings, ion exchange resins, oil recovery, biological membranes, batteries, and the like. The resultant articles can be utilized as perm-selective membranes for fuel cell or battery applications. In addition, the resultant articles may be applied to electrodes for the construction of a membrane-electrode-assembly, may be imbibed with various liquids, or may be introduced onto or into a reinforcing matte or porous web to increase mechanical integrity.

A polymeric ion membrane or polyelectrolyte membrane can be made from the polymer blend of the present invention. The formed film or membrane may be used as a single layer, or may be part of a multi-layer film or membrane. The polymeric ion membrane can be prepared from conventional film preparation methods, such as melt extrusion, solvent cast, latex cast, and the like. Membrane electrode assemblies can be made from the membranes of the present invention and fuel cells using this membrane electrode assembly can be prepared. In using the polymers of the present invention to form membranes, the polymer can have any equivalent weight (g of acid groups per g of total polymer) and preferably has an equivalent weight of from about 200 to about 8,000, and preferably from about 200 to about 1,500 and even more preferably from about 200 to about 1,400, with respect to the polyelectrolyte present in the polymer blend.

The compositions of the present invention are especially useful in fuel cells, batteries, and the like. The design and components used in the fuel cell and batteries would be the same as in conventional fuel cells and batteries except using the compositions of the present invention in the formation of the polymeric ionic exchange membrane. Accordingly, the designs and manners of making the fuel cells and batteries as described in U.S. Pat. No. 5,795,668, EP 1 202 365 A1, PCT Publication No. WO 98/22989, WO 02/075835, and WO 98/20573, Lin et al., Journal of Applied Polymer Science, Vol. 70, 121-127 (1998), can be used in the present invention and are fully incorporated herein in their entireties by reference. The membrane can be used alone or with conventional fillers, such as silica and the like. The fuel cell may use a liquid or gaseous fuel such as a liquid hydrocarbon like methanol or gas like hydrogen. The fuel cell of the present invention is capable of operating at a wide range of operating conditions. The fuel cell of the present invention can have a porous support layer and an ion exchange resin wherein the ion exchange resin is supported on at least one side of the porous support layer. The present invention can be useful in hydrogen, direct methanol, or other fuel cells. Preferably, the fuel cells of the present invention have low fuel crossover, high protonic conductivity, and/or high mechanical strength. The thickness of the membrane can be conventional but is preferably from about 0.5 to about 10 mils and more preferably from about 0.5 mil to about 5 mils. Further, the membrane preferably has an equivalent weight of from about 200 to about 2500, and more preferably about 200 to about 1400. The porous support layer can be made from any conventional material such as a fluoro-containing polymer or other hydrocarbon containing polymers such as polyolefin. The porous support layer has conventional parameters with respect to pore diameter, porosity, and thickness. The fuel cells of the present invention preferably have excellent proton conductivity, chemical resistance and low gas cross-over, relatively high electrical resistance, and high protonic conductivity.

EXAMPLES

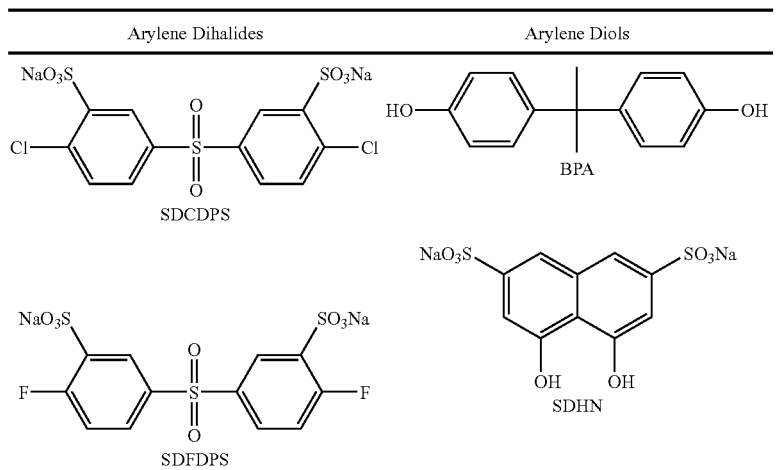

| Arylene Dihalides | Arylene Diols |
|---|---|
| 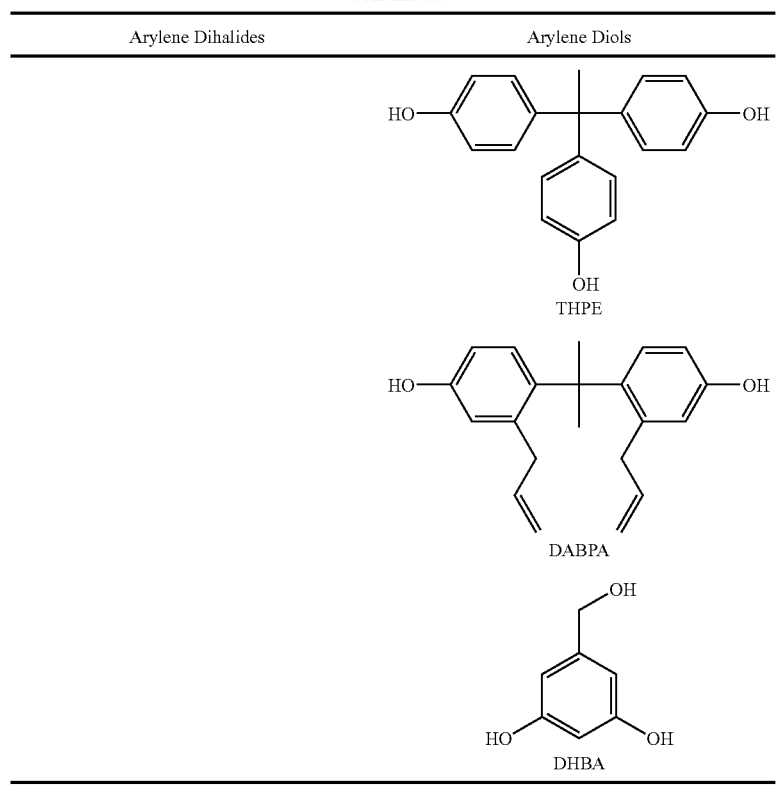 | |

Acronyms:
BPA: bisphenol A
DABPA: 2,2'-diallylbisphenol A
DCDPS: 4,4'-dichlorodiphenyl sulfone, disodium salt
DFDPS: 4,4'-difluorodiphenyl sulfone, disodium salt
DHBA: 3,5-dihydroxybenzyl alcohol
SDCDPS: 4,4'-dichloro-3,3'-disulfonatodiphenyl sulfone, disodium salt
SDFDPS: 4,4'-difluoro-3,3'-disulfonatodipheenyl sulfone, disodium salt
SDHN: 4,5-dihydroxy-2,7-disulfonatonaphthalene, disodium salt dihydrate
THPE: 1,1,1-tris(4-hydroxyphhenyl)ethane

Example 1

Preparation of SDCDPS (Sulfonated Dichlorodiphenylsulfone)

Dichlorodiphenylsulfone (108.00 g, 338.6 mmol) was added to a round bottom flask and dissolved in 210 mL fuming sulfuric acid. Following dissolution of the majority of the sulfone, the contents were heated at 110° C. for 16 h under $N_2$. The reaction mixture was then cooled and enough water was added to give a white precipitate. Solvent was decanted and enough water was added to dissolve the solids at 70° C. The solution was then neutralized using 0.5 M $NaOH_{aq}$ and allowed to cool. The crystals formed were recovered by filtration and recrystallized twice in water to yield SDCDPS as a white solid (169.17 g, 95.0% yield).

Example 2

Preparation of SDFDPS (Sulfonated Difluorodiphenylsulfone)

Difluorodiphenylsulfone (25.277 g, 88.4 mmol) was added to a round bottom flask and dissolved in 55 mL fuming sulfuric acid. Following dissolution of the majority of the sulfone, the contents were heated at 110° C. for 20 h under $N_2$. The reaction mixture was then cooled and enough water was added to give a white precipitate. Solvent was decanted and enough water was added to dissolve the solids at 70° C. The solution was then neutralized using 0.5 M NaOH(aq) and allowed to cool. The crystals formed were recovered by filtration and recrystallized in water to yield SDFDPS as a white solid (22.20 g, 51.4% yield (unoptimized)).

Example 3

Preparation of a Copolymer from SDCDPS and BPA

SDCDPS (10.00 g, 19.0 mmol) and BPA (4.36 g, 19.1 mmol) were added to a multineck flask and dissolved in a mixture of 80 mL NMP/40 mL PhMe. $K_2CO_3$ (3.03 g, 22.0 mmol, 1.16 eq) was added and the contents were refluxed with the aid of a Dean-Stark trap for 3.5 h at 150° C. The temperature was then increased to 190° C. and reflux was continued for an additional 36 h. After cooling, the reaction mixture was filtered to remove salts and the polymer was precipitated into acetone. The polymer was recovered by vacuum filtration and dried to yield the product as a tan solid (8.53 g, 66% yield).

Example 4

Preparation of a Terpolymer from SDCDPS, BPA, and THPE

SDCDPS (10.45 g, 19.9 mmol), BPA (3.66 g, 16.0 mmol), and THPE (0.82 g, 2.67 mmol) were added to a multineck flask and dissolved in a mixture of 80 mL DMAc/40 mL PhMe. $K_2CO_3$ (3.18 g, 23.0 mmol, 1.15 eq) was added and the contents were refluxed with the aid of a Dean-Stark trap for 15 h at 140° C. The temperature was then increased gradually to 160° C. and reflux was continued for an additional 24 h. After cooling, the reaction mixture was filtered to remove salts and the polymer was precipitated into acetone. The polymer was recovered by vacuum filtration and dried to yield the product as a white solid (1.66 g).

Example 5

Preparation of a Terpolymer from SDCDPS, BPA, and DABPA

SDCDPS (8.75 g, 16.8 mmol), BPA (3.07 g, 13.4 mmol), and DABPA (1.04 g, 3.36 mmol) were added to a multineck flask and dissolved in a mixture of 80 mL DMAc/40 mL PhMe. $K_2CO_3$ (2.66 g, 19.3 mmol, 1.15 eq) was added and the contents were refluxed with the aid of a Dean-Stark trap for 4 h at 135° C. The temperature was then increased gradually to 160° C. and reflux was continued for an additional 16 h. After cooling, the reaction mixture was filtered to remove salts and the polymer was precipitated into acetone. The polymer was recovered by vacuum filtration and dried to yield the product as a white solid (2.43 g).

Example 6

Preparation of a Terpolymer from SDFDPS, SDHN, and DABPA

SDFDPS (7.31 g, 15.0 mmol), SDHN (4.80 g, 12.0 mmol), and DABPA (0.93 g, 3.00 mmol) were added to a multineck flask and dissolved in a mixture of 60 mL DMAc/30 mL PhMe. $K_2CO_3$ (2.38 g, 17.2 mmol, 1.15 eq) was added and the contents were refluxed with the aid of a Dean-Stark trap for 1 h at 135° C. The temperature was then increased gradually to 160° C. and reflux was continued for an additional 22 h. After cooling, the reaction mixture was filtered to remove salts and the polymer was precipitated into acetone. The polymer was recovered by vacuum filtration and dried to yield the product as a white solid (6.83 g).

Example 7

Preparation of a Terpolymer from SDFDPS, BPA, and DHBA

SDFDPS (4.30 g, 8.8 mmol), BPA (1.61 g, 7.0 mmol), and DHBA (0.25 g, 1.76 mmol) were added to a multineck flask and dissolved in a mixture of 40 mL DMAc/20 mL PhMe. $K_2CO_3$ (1.40 g, 10.1 mmol, 1.15 eq) was added and the reaction mixture was stirred for 18 h over $N_2$. The contents were then refluxed with the aid of a Dean-Stark trap for 90 min at 145° C. The temperature was then increased gradually to 160° C. and reflux was continued for an additional 5 h. The reaction mixture was then cooled and an insoluble mass was removed. After adding additional $K_2CO3$ (0.54 g), reflux was reestablished and the mixture was stirred for 18 h over $N_2$. After cooling, a second insoluble mass was removed and polymer was recovered by precipitation into acetone. Vacuum filtration and drying of the precipitated polymer afforded a white solid product.

What is claimed is:

1. A polyelectrolyte comprising one or more backbone units,
   wherein said polyelectrolyte backbone comprises substituted aryl units and no linear alkyl units of 2 or more carbons in the backbone,
   and wherein said aryl groups are substituted from 1 to 49 mole percent of highly-acidic functional groups and from 1 to 49 mole percent of cross-linkable groups that will crosslink with other polyelectrolyte crosslinkable groups, selected from the group consisting of alcohol, amine, vinylic group, alkyl halide, alkanol, alkylamine,
   and wherein said aryl groups are joined together by electron-withdrawing and/or nucleophilic functional groups wherein said electron-withdrawing group is a sulfone and said nucleophilic functional group is an alcohol.

2. The polyelectrolyte of claim 1 wherein said polyelectrolyte contains at least different monomeric units.

3. The polyelectrolyte of claim 1 wherein said aryl units comprise aryl-ether units.

4. The polyelectrolyte of claim 1, wherein polyelectrolyte comprises sulfonated naphyl diols.

5. The polyelectrolyte of claim 1, wherein said polyelectrolyte comprises 3,5-dihydroxybenzyl alcohol (DHBA) as a diol and/or as the cross-linkable group.

6. The polyelectrolyte of claim 1, wherein said polyelectrolyte is formed from a single monomer bearing acidic and cross-linkable groups.

7. The polyelectrolyte of claim 1, having 50 mol.-% of a leaving group monomer, and 50 mol.-% of a nucleophilic monomer.

8. The polyelectrolyte of claim 7, wherein up to 50 mole percent of said nucleophilic monomer units comprises cross-linkable monomer.

9. The polyelectrolyte of claim 1, having the formula:

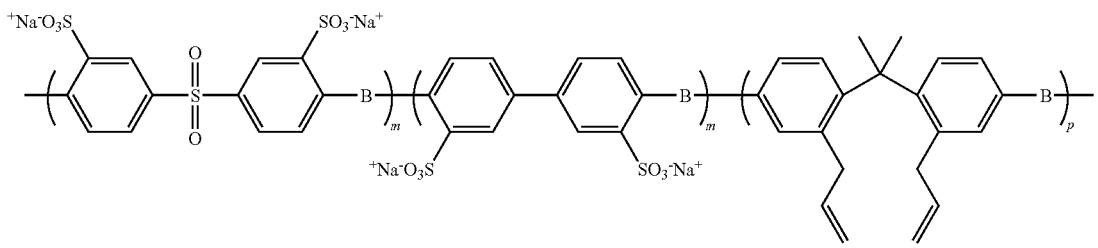

wherein:
n=(1−m)−p
p=(1−m)−n
m=0.5 (50 mol.-% of monomer units)
n=0.01 to 0.49 (1 mol.-% to 49 mol.-% of monomer units)
p=0.01 to 0.49 (1 mol.-% to 49 mol.-% of monomer units)
B=a nucleophilic group.

10. The polyelectrolyte of claim 1, wherein said polyelectrolyte is in the form of a neutral salt, organic quaternary ammonium salt, tetrabutyl ammonium (TBA) salt, or acid.

11. A process for forming the polyelectrolyte of claim 1, comprising completing the following polymerization:

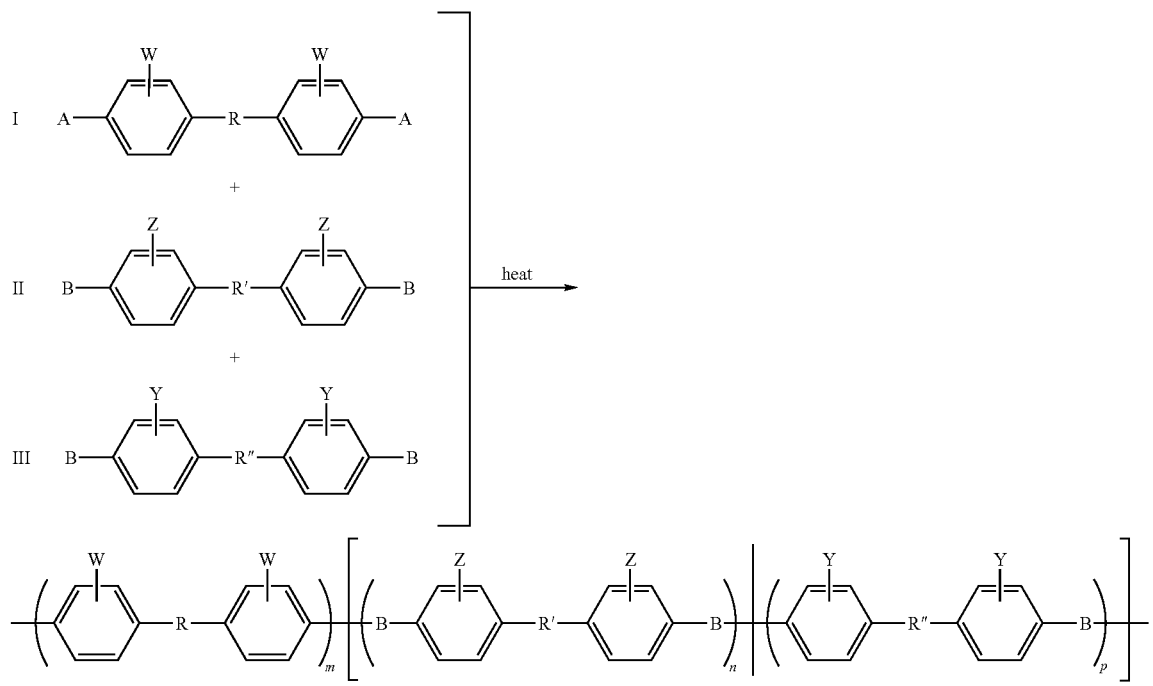

where:
A=a 'leaving' group capable of eliminating from the monomer by nucleophilic attack,
B=a nucleophilic group,
R=an electron-withdrawing group which is also hydrolytically and free-radical attack stable,
R'=R or another hydrolytically-stable and free radical-stable group,
R"=R' and/or =R, or another hydrolytically-stable and free radical-stable group,
W=Sulfonate, phosphonate, carboxylate
Z=Hydrogen, sulfonate, phosphonate, carboxylate
Y=Group capable of cross-linking,
wherein
  Groups Z and Y can be bound to any open position on each aromatic ring, either ortho or meta to groups R, R', R" with one group (Z or Y) per aromatic ring,
  **Mol fractions of monomers are such that I=50%, II= [(1.0−I)−III]; and III=[(1.0−I)−II]],
  **II=0.01 to 0.49 mol fraction; III=0.01 to 0.49 mol fraction, and
  **** wherein, when group Z is hydrogen, post-polymerization reaction can be performed to introduce a group W onto the ring.

12. A process for forming the polyelectrolyte of claim 1, comprising completing the following polymerization:

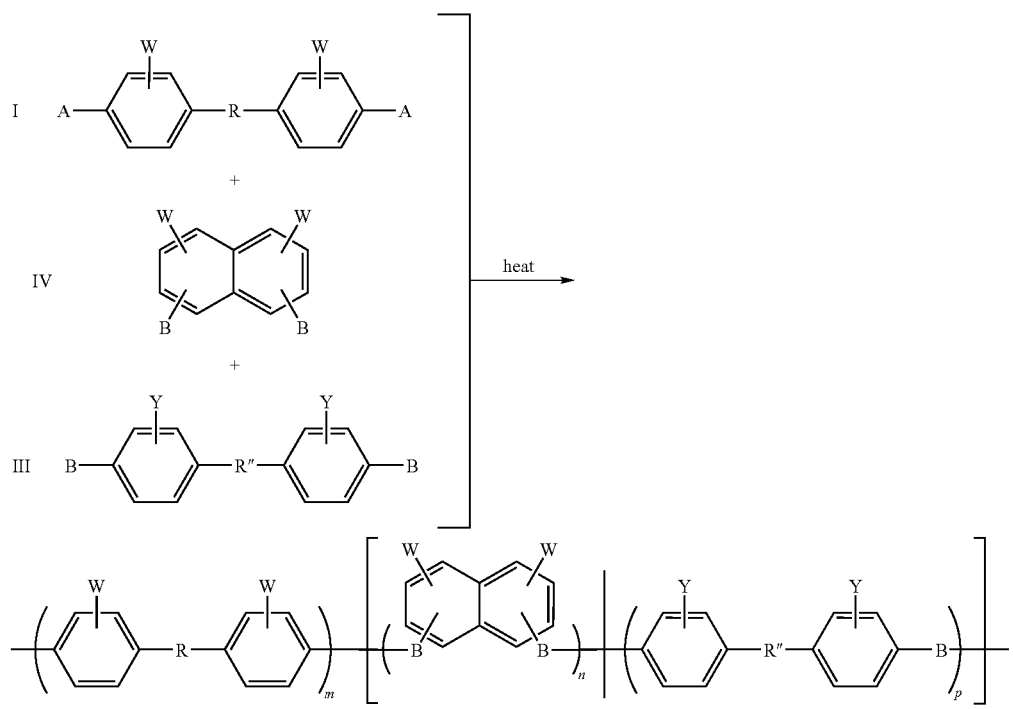

where:
- A = a 'leaving' group capable of eliminating from the monomer by nucleophilic attack,
- B = a nucleophilic group,
- R = an electron-withdrawing group which is also hydrolytically and free-radical attack stable,
- R" = hydrolytically-stable and free radical-stable group,
- W = Sulfonate, phosphonate, carboxylate
- Z = Hydrogen, sulfonate, phosphonate, carboxylate
- Y = Group capable of cross-linking, wherein
- *Groups B on monomer IV can be bound to the naphthalenic ring at any position (1-8), not occupied by a group W,
- **Groups W on monomer IV can be bound to the naphthalenic ring at any position (1-8), not occupied by a group B,
- ****Mol fractions of monomers are such that I=50%, IV=[(1.0−I)−III]; and III=[(1.0−I)−IV)], such that the mol fractions in the final copolymer are m=(n+p)=0.5, n=0.01 to 0.49, and p=0.01 to 0.49.

13. A process for forming the polyelectrolyte of claim 1, comprising completing the following polymerization

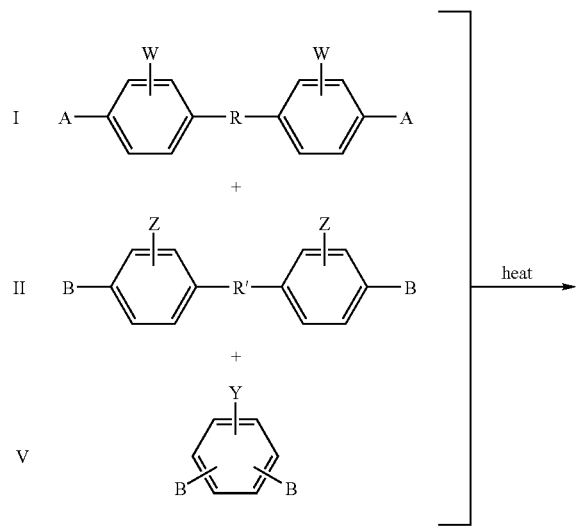

-continued

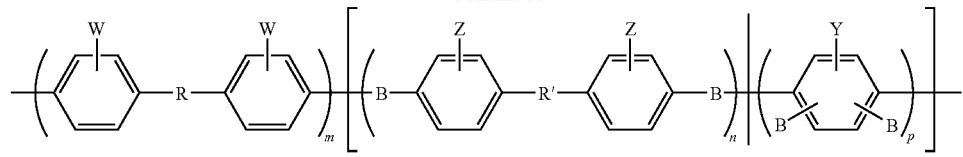

Where:
- A = a 'leaving' group capable of eliminating from the monomer by nucleophilic attack,
- B = a nucleophilic group,
- R = an electron-withdrawing group which is also hydrolytically and free-radical attack stable,
- R″ = R′ and/or = R, or another hydrolytically-stable and free radical-stable group,
- W = Sulfonate, phosphonate, carboxylate
- Z = Hydrogen, sulfonate, phosphonate, carboxylate
- Y = Group capable of cross-linking, wherein
*if Groups Z on monomer II, are hydrogen, conversion to acidic groups W may be possible,
**Groups B on monomer IV may be bound to any ring position not occupied by Group Y,
***Group Y on monomer IV may be bound to any ring position not occupied by Groups B,
****Mol fractions of monomers are such that I=50%, II=[(1.0−I)−V]; and V=[(1.0−I)−II]; such that the mol fractions in the final copolymer are m=(n+p)=0.5, n=0.01 to 0.49, and p=0.01 to 0.49.

14. A process for forming the polyelectrolyte of claim 1, comprising completing the following polymerization:

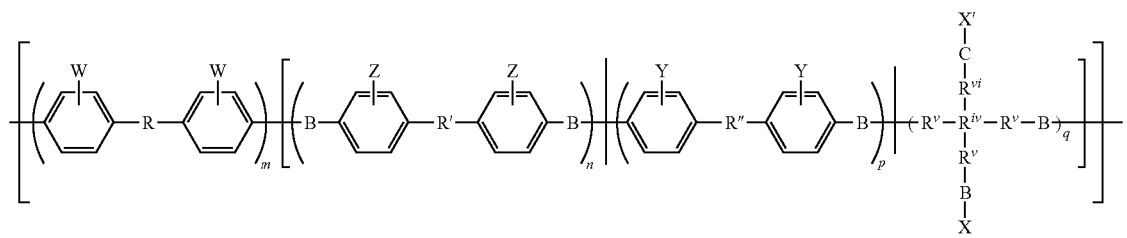

where:
- A=a 'leaving' group capable of eliminating from the monomer by nucleophilic attack,
- B=a nucleophilic group,
- R=an electron-withdrawing group which is also hydrolytically and free-radical attack stable,
- R'=R or another hydrolytically-stable and free radical-stable group,
- R"=R' and/or =R, or another hydrolytically-stable and free radical-stable group,
- $R^{iv}$=a carbon atom, alkane, perfluoroalkane, cycloalkane, aryl, or other hydrolytically- and free-radical-stable group capable of bearing 3 or more additional groups,
- $R^v$=an alkyl, cycloalkyl, perfluoroalkyl, aryl, benzyl, or other hydrolytically- and free-radical-stable group,
- $R^{vi}$=$R^v$, or is another group selected from those listed for group $R^v$,
- C=a hydrogen, alkyl, cycloalkyl, perfluoroalkyl, aryl, benzyl, or other hydrolytically- and free-radical-stable group, OR, if $R^{vi}$=$R^v$, then C=B,
- X=an additional aryl-backbone polymer chain (as shown) containing additional branching monomers (branching points) VI
- X'=X; IF Rvi=Rv and therefore C=B, Otherwise X'=a hydrogen,
- W=Sulfonate, phosphonate, or carboxylate
- Z=Hydrogen, sulfonate, phosphonate, or carboxylate
- Y=Group capable of cross-linking, wherein:
- *Mol fractions of monomers are such that I=50%, II=[(1.0−I)−(III+VI); and III=[(1.0−I)−(II+VI)]; and VI=[(1.0−I)−(II+III)]; such that the mol fractions in the final copolymer are m=(n+p+q)=0.5, n=0.01 to 0.48, and p=0.01 to 0.48, and q=0.01 to 0.48.

15. A process for forming the polyelectrolyte of claim 1, comprising completing the following polymerization:

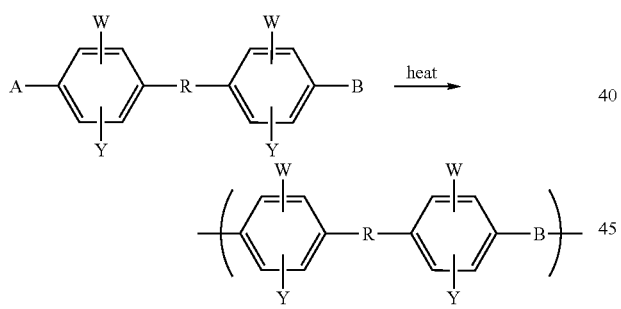

Where:
- A=a 'leaving' group capable of eliminating from the monomer by nucleophilic attack,
- B=a nucleophilic group,
- R=an electron-withdrawing group which is also hydrolytically and free-radical attack stable,
- W=Sulfonate, phosphonate, carboxylate
- Y=Group capable of cross-linking.

16. The process of claim 11, comprising the step of converting said neutralized polyelectrolyte to the $H^+$ form using ion-exchange and solvent-exchange.

17. A polyelectrolyte blend comprising the polyelectrolyte claim 1 and a matrix polymer, wherein said polyelectrolyte and matrix polymer are different.

18. A film or membrane formed from said polyelectrolyte blend of claim 17.

19. The film of claim 18, comprising a separator in a fuel cell.

20. A polyelectrolyte consisting of related aryl groups on the polymer backbone and possessing one or more repeat units, wherein one repeat unit is substituted at 1 to 49 percent with sulfonate functional groups and the same or a different unit is substituted at 1 to 49 percent with crosslinkable groups.

21. The composition of claim 9, wherein: B is an alcohol.

22. The process of claim 11, wherein
- A is selected from the group consisting of F, Cl, Br, I, nitro, and fluorosulfonate ester,
- B is an alcohol,
- R is a sulfone,
- R' is selected from the group consisting of a bond, disubstituted alkane, disubstituted perfluoroalkane, ether, thioether, and (alkyl)amine,
- R" is selected from the group consisting of R', R, a bond, disubstituted alkane, disubstituted perfluoroalkane, ether, thioether, and (alkyl)amine,
- Y is selected from the group consisting of alcohol, amine, vinylic, and alkyl halide.

23. The process of claim 12, wherein:
- Groups B on monomer IV are bound at the 4- and 5-positions, and Groups W at the 2- and 7-positions,
- A is selected from the group consisting of F, Cl, Br, I, nitro, and fluorosulfonate ester,
- B is an alcohol,
- R is a sulfone,
- R" is selected from the group consisting of a bond, disubstituted alkane, disubstituted perfluoroalkane, ether, thioether, and (alkyl)amine, and
- Y is selected from the group consisting of alcohol, amine, vinylic, and alkyl halide.

24. The process of claim 13, wherein:
- Groups B on monomer IV are bound at the 4- and 5-positions, and Groups W at the 2- and 7-positions,
- A is selected from the group consisting of F, Cl, Br, I, nitro, and fluorosulfonate ester,
- B is an alcohol,
- R is a sulfone,
- R" is selected from the group consisting of a bond, disubstituted alkane, disubstituted perfluoroalkane, ether, thioether, and (alkyl)amine, and
- Y is selected from the group consisting of alcohol, amine, vinylic, and alkyl halide.

25. The process of claim 14, wherein
- A is selected from the group consisting of F, Cl, Br, I, nitro, and fluorosulfonate ester,
- B is an alcohol,
- R is a sulfone,
- R' is selected from the group consisting of a bond, disubstituted alkane, disubstituted perfluoroalkane, ether, thioether, and (alkyl)amine,
- R" is selected from the group consisting of R', R, a bond, disubstituted alkane, disubstituted perfluoroalkane, ether, thioether, and (alkyl)amine,
- Y is selected from the group consisting of alcohol, amine, vinylic, and alkyl halide.

* * * * *